United States Patent [19]

Schmidt et al.

[11] Patent Number: 5,079,465
[45] Date of Patent: Jan. 7, 1992

[54] ELECTRIC STARTER MOTOR FOR INTERNAL COMBUSTION ENGINES

[75] Inventors: Peter Schmidt, Schwieberdingen; Erich Droll, Caihingen/Enz; Erwin Elser, Markgröningen, all of Fed. Rep. of Germany

[73] Assignee: Robert Bosch GmbH, Stuttgart, Fed. Rep. of Germany

[21] Appl. No.: 617,272

[22] Filed: Nov. 16, 1990

Related U.S. Application Data

[63] Continuation of Ser. No. 378,240, filed as PCT/DE87/00511, Nov. 12, 1986, published as WO88/04489, Jun. 16, 1988, abandoned.

[30] Foreign Application Priority Data

Dec. 8, 1986 [DE] Fed. Rep. of Germany ....... 3641874

[51] Int. Cl.⁵ .................. H02K 7/08; F16C 33/76; F16C 23/08
[52] U.S. Cl. .................... 310/90; 384/204; 384/489
[58] Field of Search .............. 310/90, 89; 384/152, 384/204, 223, 278, 368, 420, 425, 489, 268

[56] References Cited

U.S. PATENT DOCUMENTS

| | | | |
|---|---|---|---|
| 2,904,709 | 9/1959 | Lautner | 310/90 |
| 3,513,339 | 5/1970 | Harris et al. | 310/90 |
| 3,626,221 | 12/1971 | Anderson et al. | 310/90 |
| 3,663,848 | 5/1972 | Heob | 310/90 |
| 3,997,805 | 12/1976 | Dochterman | 310/90 |
| 4,387,315 | 6/1983 | Barthruff et al. | 310/90 |
| 4,458,405 | 7/1984 | Cavagnero et al. | 29/467 |

FOREIGN PATENT DOCUMENTS

| | | |
|---|---|---|
| 3131148 | 2/1983 | Fed. Rep. of Germany . |
| 1168610 | 12/1958 | France ............... 384/489 |
| 1356331 | 2/1964 | France ............... 384/489 |
| 134376 | 8/1984 | Japan . |
| 0066949 | 12/1913 | Switzerland ........ 384/489 |
| 2152294 | 7/1985 | United Kingdom . |
| 2157766 | 10/1985 | United Kingdom . |

Primary Examiner—Steven L. Stephan
Assistant Examiner—C. LaBalle
Attorney, Agent, or Firm—Michael J. Striker

[57] ABSTRACT

An end shield and bearing assembly for an electric starter motor for internal combustion engines comprises a bearing extension and a bearing for supporting a drive shaft and received in the bearing extension. A cover cap is fitted over the bearing extension of the commutator end shield and encloses the end of the drive shaft and an armature longitudinal play compensator mounted on the above shaft end. A member is located lubricant-tight in the cover cap between the end face of the bearing extension and the cover cap and defines a lubricant space surrounding the compensator.

1 Claim, 2 Drawing Sheets

ELECTRIC STARTER MOTOR FOR INTERNAL COMBUSTION ENGINES

This application is a continuation-in-part of application Ser. No. 378,240, filed as PCT/DE87/00511, Nov. 12, 1986, published as WO88/04489, Jun. 16, 1988, now abandoned.

BACKGROUND OF THE INVENTION

The starting point of the invention is an electric starter motor for internal combustion engines which motor comprises a drive shaft for rotatably supporting an armature and a commutator. The drive shaft itself is supported for rotation in drive and commutator bearings of which the latter is covered with a cap. Such a starter motor is disclosed in DE-OS 31 31 148. In this starter motor lubricant leaks into the cover cap fitted relatively tightly over the parts of an armature longitudinal play compensator and of a bearing extension of the commutator end shield, and screwed the end face of the commutator end shield. In this arrangement it is a disadvantage that the lubricant is not held sufficiently leaktightly in the cover cap. The lubricant intended to lubricate the drive shaft support point in a plain bearing inserted in the bearing extension can to a great extent escape between the bearing extension and the cover cap. Lubricant consumption is therefore undesirably high. In addition, undesirable noise is repeatedly caused through collision between the cover cap and an inserted disc provided with an U-shaped opening. Bearing damage through lack of lubricant.

SUMMARY OF THE INVENTION

The object of the invention is providing an electric starter motor for internal combustion engines in which substantial damping of noise at the drive shaft support point is achieved and more effective lubrication of the bearing with substantially less lubricant is made possible.

The object of the invention is achieved by mounting in the cover cap means lubricant tightly held on a bearing extension of the commutator end shield.

In this connection it is an advantage that the space receiving the lubricant is sealed against the outside by simple means which are inserted into the cover cap and lie sealingly against the end face of the bearing extension. Lubricant now passes only to the support point of the armature shaft in the plain bearing and to the parts of the armature longitudinal play compensator, so that the disadvantages of the known solution are avoided.

It is particularly advantageous to insert into the cover cap a lubricant cap which is in the form of an inexpensively produced plastic part and which holds the lubricant and bears against the end face of the bearing extension. The lubricant cap also does not necessitate any lengthening of the cover cap, since the sealed lubricant chamber can be made smaller than hitherto because of reduced lubricant requirements. On the other hand, it has been found particularly advantageous to form in the cover cap, which in any case is in the form of a deep-drawn component, an internal annular shoulder against which lies a sealing ring which is inserted into the cover cap and which also bears sealingly against the end face of the bearing extension and against at least a part of the armature longitudinal play compensator.

The novel features which are considered as characteristic for the invention are set forth in particular in the appended claims. The invention itself, however, both as to its construction so to its mode of operation, together with additional objects and advantages thereof, will be best understood from the following description of preferred embodiment when read in connection with the accompanying drawings.

DESCRIPTION OF THE PREFERRED EMBODIMENTS

Figure 1:
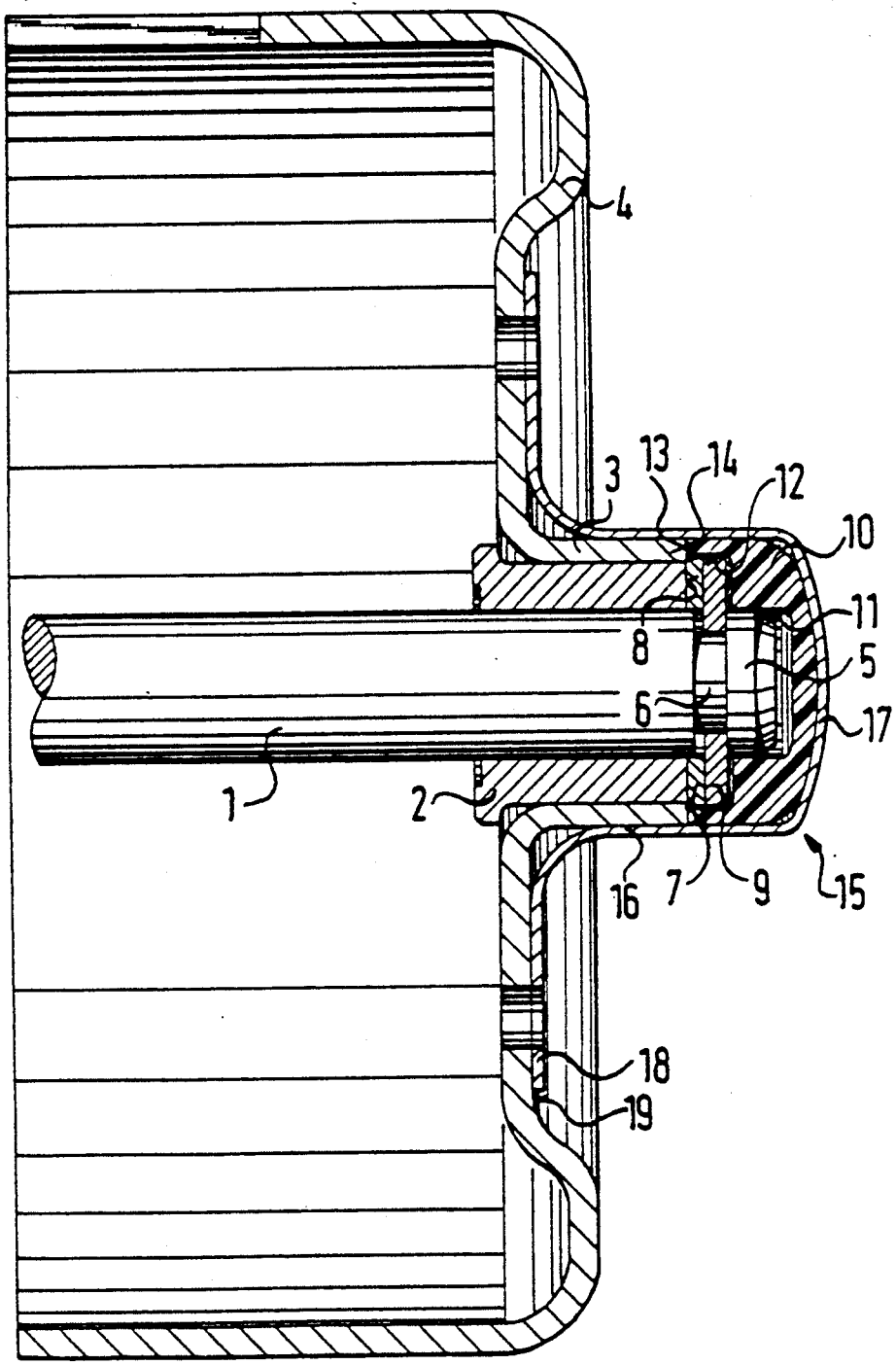
FIG. 1 shows a longitudinal cross-sectional partial view of a first embodiment of an electric starter motor according to the invention, in particular of an end of the electric starter motor at which the commutator is disposed.

The starter motor shown in FIG. 1 has a drive shaft 1, which is mounted for rotation in a plain bearing 2. The plain bearing 2 is inserted into a bearing extension 3 of a commutator end shield 4, which closes the motor casing in a manner which is known per se and not further illustrated. Near its end 5 projecting out of the plain bearing 2, the drive shaft 1 is provided with an annular groove 6. A compensator disc 7 serves as armature longitudinal play compensator. It is pushed past the annular groove 6 onto the drive shaft 1 and lies against the end face 8 of the plain bearing 2. An inserted disc 9, which is pushed into the annular groove 6 and for example is U-shaped, lies on one side against the compensator disc 7 and on the other side against that side wall of the annular groove 6 which lies nearer the end 5 of the drive shaft 1, so that the drive shaft 1 is mounted for rotation in its allotted axial position in the starter motor.

A lubricant cap 10 is, for example in the form of a plastics component. It has a bowl-shaped depression 11 adjoining a widened end portion 12. The diameter of the depression 11 is only slightly larger than the diameter of the end 5 of the drive shaft 1. The diameter of the widened end portion 12 is only slightly larger than the diameter of the compensator disc 7 and inserted disc 9. At the same time metallic contact between the inserted disc 9 and the cover cap 15 is thus prevented, so that no noise can occur. Lubricant is introduced into the depression 11. The lubricant cap 10 is pushed over the end 5 and the discs 7 and 9 and lies with its end face 13 against the end face 14 of the bearing extension 3. A cover cap 15, in the form of a deep-drawn metal part, has its pot-shaped middle portion 16 pushed over the lubricant cap 10 onto the bearing extension 3. The bottom 17 of the cover cap 15 holds the lubricant cap 10, 13 lubricant-tightly against the end face 14 of the bearing extension 3, for which purpose a flange 18 on the open end of the cover cap 15 is detachably fastened, in a manner known per se and not further illustrated, to the outer end face 19 of the commutator end shield 4.

Figure 2:
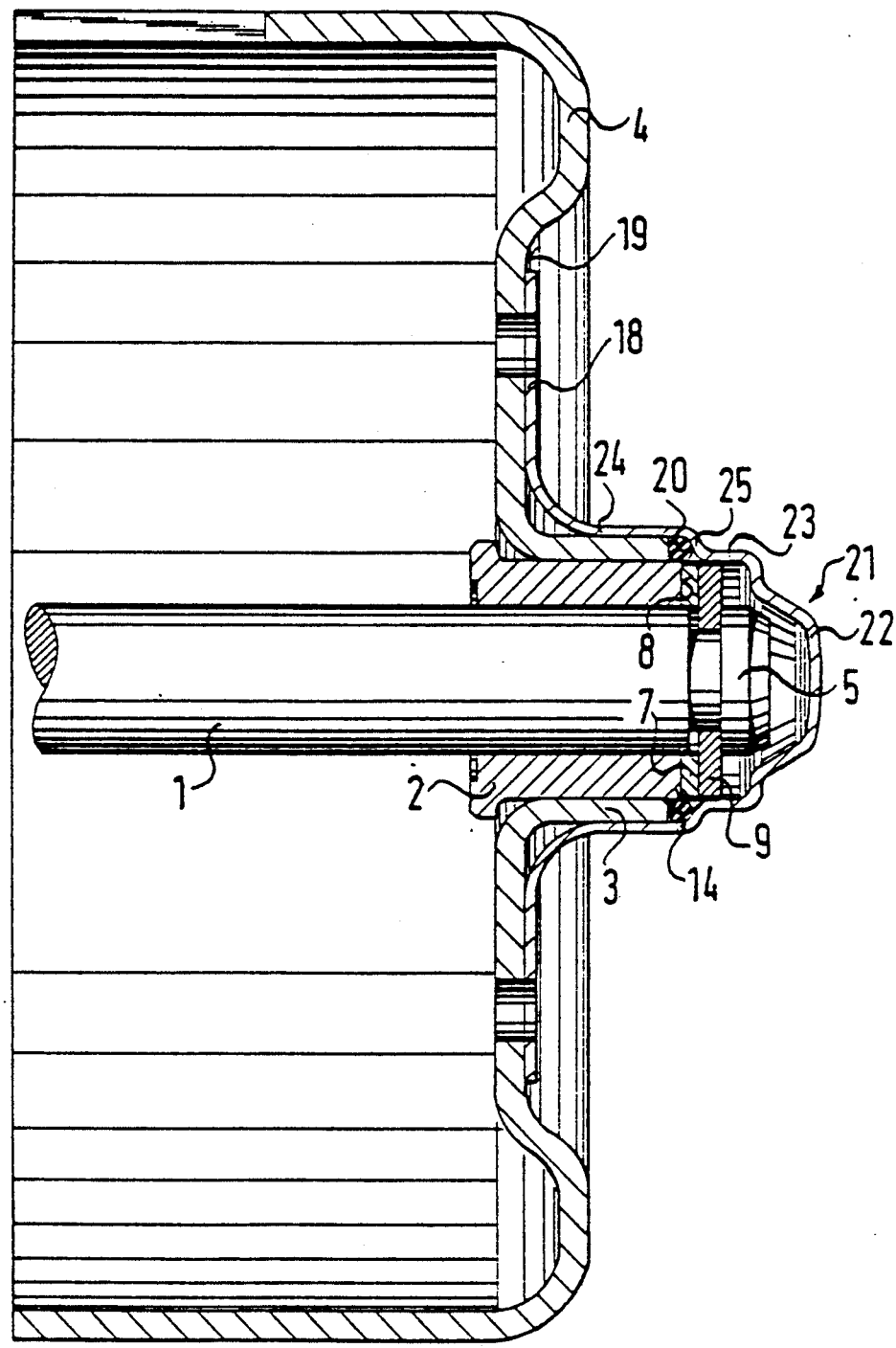
FIG. 2 shows the same view of a second embodiment of an electric starter motor according to the invention.

The parts of the second embodiment shown in FIG. 2 the same reference numerals when they are identical with similar parts shown in FIG. 1.

The drive shaft 1 is once again mounted rotatably in the plain bearing 2, which is inserted into the bearing extension 3 of the commutator end shield 4. The compensator disc 7 of the armature longitudinal play compensator is held by the inserted disc 9 to bear against the end face 8 of the plain bearing 2. The plain bearing 2 projects out of the bearing extension 3 and thus projects beyond the end face 14 of the latter and forms a seat for a seal ring 20. The seal ring 20 is for example in the form of an O-ring.

A cover cap 21 is once again in the form of a deep-drawn metal part. It has a bowl-like portion 22 into which lubricant is introduced. This bowl-like portion 22 adjoins a widened cylindrical portion 23, the diameter of which is only slightly larger than that of the discs 7 and 9. The portion 23 is followed by a another cylindrical portion 24, which has a still larger diameter. The portion 24 adjoins the flange 18 of the cover cap 21. The cylindrical portion 24 has an inside diameter adapted to the outside diameter of the bearing extension 3 of the commutator bearing 4. The transition between the portions 23 and 24 forms an internal annular shoulder 25 for the axial support of the seal ring 20.

The seal ring 20 can be installed by insertion into the cover cap 21, lying against the internal annular shoulder 25, or it can be pushed onto the end of the plain bearing 2 which projects out of the bearing extension 3. The cover cap 21 is pushed over the end 5 of the drive shaft 1. The cylindrical portion 23 then surrounds the discs 7 and 9, and the cylindrical portion 24 surrounds the seal ring 20 and the bearing extension 3. When the flange 18 is detachably fastened to the outer end face 19 of the commutator bearing 4, the internal annular shoulder 25 presses the seal ring 20 lubricant-tightly both against the end face 14 of the end shield extension 3 and against the inside wall of the cylindrical portion 24 of the cover cap 21.

By means of the lubricant cap 10 or the seal ring 20 the lubricant chamber provided in the detachably fastened cover cap 15 or 21 can be covered in a simple, cost reducing manner without sacrificing the advantage of the cover cap 15 or 21 detachably fastened to the commutator end shield 4, 19, with compensation for longitudinal play of the armature when the starter device is installed. The lubricant cap 10 or the seal ring 20 enables the drive shaft 1 to turn in the plain bearing 2, and therefore at the point of support of the drive shaft 1 at the commutator end, with little noise and with adequate lubrication, while the consumption of lubricant, despite its adequate supply, is low.

While the invention has been illustrated and described as embodied in an electric starter motor for internal combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An end shield and bearing assembly for an electric starter motor for internal combustion engines, comprising a drive shaft for supporting an armature and a commutator and having an end; means mounted on said end of said drive shaft for compensating longitudinal play of the armature; a bearing for supporting said drive shaft for rotation; a commutator end shield having a bearing extension for receiving said supporting bearing and having an end face; a cover cap fitted over said bearing extension of said commutator end shield and having a middle pot-shaped portion for enclosing said end of said drive shaft with said compensating means; and means located lubricant-tight in said cover cap between said end face of said bearing extension and said cover cap and defining a lubricant space surrounding said compensating means, said lubricant space-defining means tightly engaging said end face of said bearing extension of said commutator end shield, said lubricant space-defining means comprising a lubricant cap which is formed of a plastic material, encloses said end of said drive shaft with said compensating means and is pressed by said cover cap against said end face of said bearing extension.

* * * * *